(12) United States Patent
Jackowski et al.

(10) Patent No.: US 10,184,425 B2
(45) Date of Patent: Jan. 22, 2019

(54) FIBER OPTIC SENSING FOR VARIABLE AREA FAN NOZZLES

(71) Applicant: The Boeing Company, Chicago, IL (US)

(72) Inventors: Jason J. Jackowski, Everett, WA (US); Kent E. Karnofski, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 15/009,298

(22) Filed: Jan. 28, 2016

(65) Prior Publication Data
US 2017/0218882 A1    Aug. 3, 2017

(51) Int. Cl.
F02K 1/18 (2006.01)
F02K 1/12 (2006.01)
G01B 11/24 (2006.01)
F02K 1/15 (2006.01)
G01L 1/24 (2006.01)
F02K 1/06 (2006.01)

(52) U.S. Cl.
CPC .......... F02K 1/18 (2013.01); F02K 1/12 (2013.01); F02K 1/15 (2013.01); G01B 11/24 (2013.01); G01L 1/242 (2013.01); F02K 1/06 (2013.01); F05D 2220/32 (2013.01); F05D 2270/051 (2013.01); F05D 2270/804 (2013.01); F05D 2270/808 (2013.01); G01L 1/246 (2013.01)

(58) Field of Classification Search
CPC ..... F02K 1/18; F02K 1/12; F02K 1/15; F02K 1/06; G01L 1/242
See application file for complete search history.

(56) References Cited

U.S. PATENT DOCUMENTS

| 4,116,000 A | 9/1978 | Martin et al. |
| 5,201,015 A | 4/1993 | von Bieren et al. |
| 5,211,007 A * | 5/1993 | Marvin ............ F02K 1/15 60/204 |
| 8,527,247 B1 * | 9/2013 | Wilson ........... G05B 13/04 416/36 |

(Continued)

OTHER PUBLICATIONS

Search Report for related European Application No. EP16199268.0; report dated May 22, 2017.

Primary Examiner — Craig Kim
Assistant Examiner — Katheryn Malatek
(74) Attorney, Agent, or Firm — Miller, Matthias & Hull LLP

(57) ABSTRACT

A control system for a variable area fan nozzle (VAFN) having a plurality of petals is disclosed. The control system may include at least one fiber optic shape sensor extending along at least one of the plurality of petals, and a light source operatively connected to the at least one fiber optic shape sensor. The control system may further include a receiver operatively connected to the at least one fiber optic shape sensor. The control system may further include a VAFN control unit in operative communication with the plurality of petals and the receiver. The VAFN control unit may be configured to receive a signal from the receiver indicative of the measured strain along the at least one fiber optic shape sensor, and calculate a nozzle area of the VAFN based on the measured strain.

18 Claims, 8 Drawing Sheets

(56) References Cited

U.S. PATENT DOCUMENTS

| | | | |
|---|---|---|---|
| 2006/0013523 A1* | 1/2006 | Childers | A61B 1/00165 |
| | | | 385/12 |
| 2006/0104561 A1 | 5/2006 | Ivtsenkov | |
| 2011/0310378 A1* | 12/2011 | Froggatt | G01D 5/35309 |
| | | | 356/35.5 |
| 2013/0020408 A1 | 1/2013 | Jasklowski et al. | |
| 2013/0306755 A1 | 11/2013 | Dittmann et al. | |
| 2014/0338324 A1* | 11/2014 | Jasklowski | F02K 1/1207 |
| | | | 60/527 |

* cited by examiner

FIBER OPTIC SENSING FOR VARIABLE AREA FAN NOZZLES

FIELD OF THE DISCLOSURE

The present disclosure relates generally to variable area fan nozzles and, more particularly, to controlling nozzle areas of variable area fan nozzles.

BACKGROUND OF THE DISCLOSURE

Bypass turbofan engines produce two exhaust flows, a core engine flow and a fan flow. The core engine flow is discharged from a core flow nozzle after passing through a core engine. The fan flow passes through an annular passageway formed by a nacelle surrounding the core engine and fan duct. The cross-sectional areas through which these two flows pass may be optimized for specific operating conditions, such as take-off, climb, cruise, etc. Variable area fan nozzles that include movable petals are used to enlarge or reduce the nozzle area of the fan flow, and thereby, decrease or increase the exhaust velocity, respectively. Different forces may act on the petals to move them from their predetermined positions and deviate from a predetermined nozzle area.

SUMMARY OF THE DISCLOSURE

In accordance with one embodiment, a control system for a variable area fan nozzle (VAFN) having a plurality of petals is disclosed. The control system may include at least one fiber optic shape sensor extending along at least one of the plurality of petals, and a light source operatively connected to the at least one fiber optic shape sensor. The light source may be configured to direct a light through the at least one fiber optic shape sensor. The control system may further include a receiver operatively connected to the at least one fiber optic shape sensor. The receiver may be configured to receive a reflected light from the at least one fiber optic shape sensor and measure a strain along the at least one fiber optic shape sensor based on the reflected light. The control system may further include a VAFN control unit in operative communication with the plurality of petals and the receiver. The VAFN control unit may be configured to receive a signal from the receiver indicative of the measured strain along the at least one fiber optic shape sensor, and calculate a nozzle area of the VAFN based on the measured strain.

In a refinement, the receiver may be further configured to determine a displacement of the at least one fiber optic shape sensor based on the measured strain.

In another refinement, the at least one fiber optic shape sensor may include an optical fiber having a plurality of Fiber Bragg gratings configured to reflect predetermined wavelengths of light.

In another refinement, the at least one fiber optic shape sensor may include Optical Frequency Domain Reflectometry (OFDR) technology configured to provide a fully distributed sensing fiber.

In another refinement, the light source may include a wavelength tunable laser.

In another refinement, the at least one fiber optic shape sensor may include three optical fibers with fiber optic sensing devices bundled together, and the receiver may be further configured to determine a three-dimensional displacement of the at least one fiber optic shape sensor based on the measured strain from the three optical fibers bundled together.

In another refinement, the VAFN control unit may be further configured to determine a three-dimensional position of the plurality of petals based on the determined three-dimensional displacement from the receiver.

In another refinement, the control system may further include an engine electronic control in communication with the VAFN control unit, the engine electronic control configured to generate a desired nozzle area for the VAFN and send a corresponding signal to the VAFN control unit.

In another refinement, the VAFN control unit may be further configured to determine a difference between the calculated nozzle area and the desired nozzle area.

In another refinement, the VAFN control unit may be further configured to generate an actuator command for the plurality of petals based on the determined difference between the calculated nozzle area and the desired nozzle area.

In another refinement, the VAFN may use one of proportional integral differential, linear quadratic regression, or bang-bang control to generate the actuator command.

In another refinement, the engine electronic control may be configured to generate the desired nozzle area based on an engine operating condition.

In accordance with another embodiment, a variable area fan nozzle (VAFN) is disclosed. The VAFN may include a plurality of petals, at least one fiber optic shape sensor extending along at least one of the plurality of petals, a light source configured to direct a light through the at least one fiber optic shape sensor, a receiver configured to receive a reflected light from the at least one fiber optic shape sensor and determine a displacement of the at least one fiber optic shape sensor based on the reflected light, an engine electronic control configured to generate a desired nozzle area of an opening defined by the plurality of petals based on an engine operating condition, and a VAFN control unit in operative communication with the plurality of petals, the receiver, and the engine electronic control.

The VAFN control unit may be configured to receive a signal indicative of the determined displacement from the receiver, calculate a nozzle area of the VAFN based on the determined displacement from the receiver, receive a signal indicative of the desired nozzle area from engine electronic control, determine a difference between the calculated nozzle area and the desired nozzle area, and generate an actuator command based on the determined difference between the calculated nozzle area and the desired nozzle area.

In a refinement, the at least one fiber optic shape sensor may extend along a perimeter of the at least one of the plurality of petals.

In another refinement, the at least one fiber optic shape sensor may include a first fiber optic shape sensor extending along a first side of the at least one of the plurality of petals, and a second fiber optic shape sensor extending along a second side of the at least one of the plurality of petals, the first side and the second side opposing each other.

In another refinement, the at least one fiber optic shape sensor may be embedded inside the at least one of the plurality of petals.

In another refinement, the at least one fiber optic shape sensor may be attached to a surface of the at least one of the plurality of petals.

In accordance with yet another embodiment, a method of controlling a nozzle area of a variable area fan nozzle (VAFN) is disclosed. The VAFN may have a plurality of petals and at least one fiber optic shape sensor on at least one of the plurality of petals. The method may include transmitting a light through the at least one fiber optic shape sensor; receiving a reflected light from the at least one fiber optic shape sensor; and measuring a strain based on the received reflected light from the at least one fiber optic shape sensor.

The method may further include determining a displacement of the at least one fiber optic shape sensor based on the measured strain, the receiving, measuring, and determining being performed by a receiver; calculating a nozzle area of an opening defined by the plurality of petals based on the determined displacement of the at least one fiber optic shape sensor; and generating an actuator command based at least in part on the calculated nozzle area, the calculating and generating being performed by a VAFN control unit.

In a refinement, the at least one fiber optic shape sensor may include three bundled optical fibers with fiber optic sensing devices to form the at least one fiber optic shape sensor, and the method may further include determining a three-dimensional shape of the plurality of petals.

In another refinement, the method may further include sending the actuator command to an actuator configured to move a flex rod in contact with the plurality of petals.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
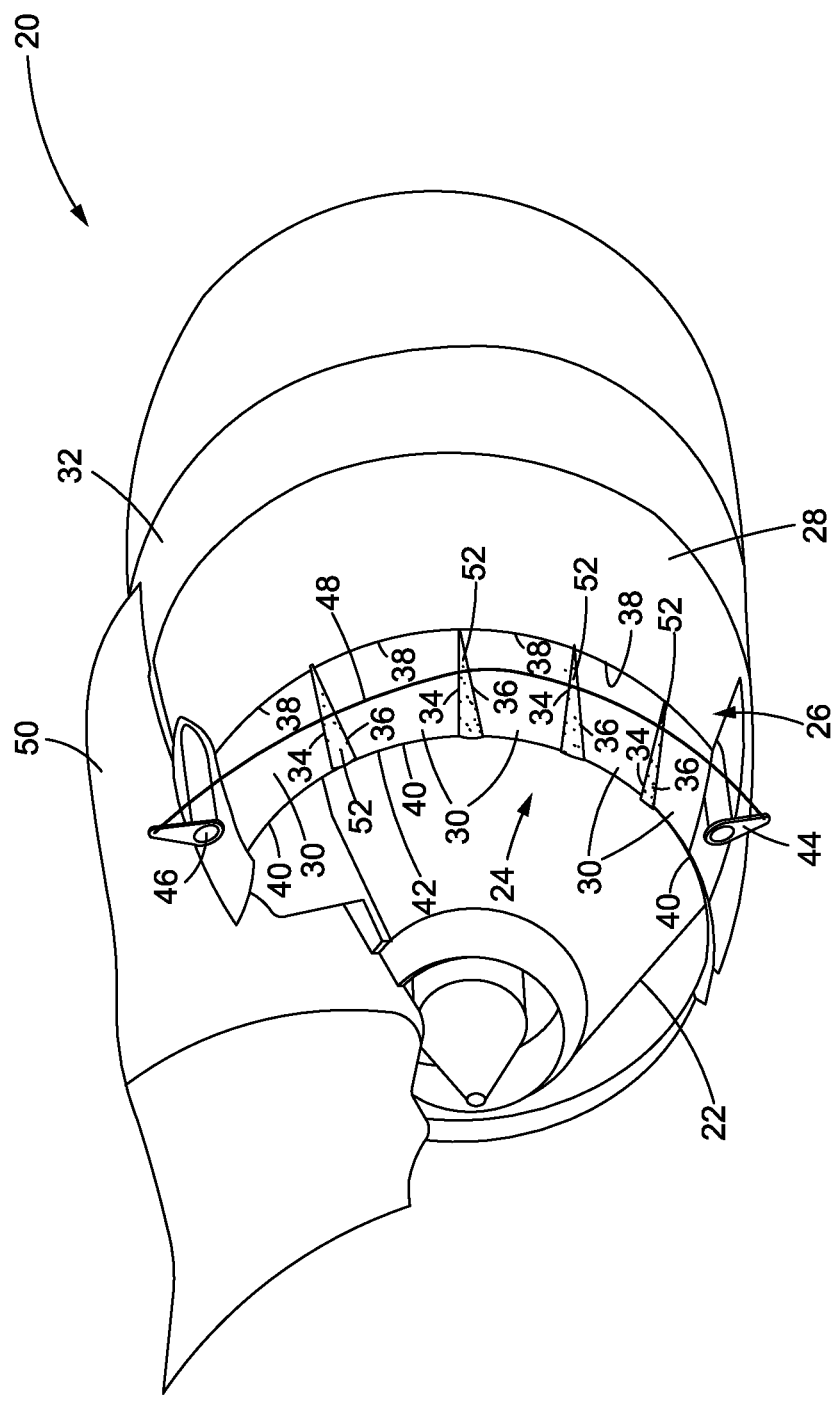
FIG. 1 is a perspective view of a turbofan engine, in accordance with one embodiment of the present disclosure.

Referring now to the drawings, and with specific reference to FIG. 1, an engine 20 is shown, in accordance with certain embodiments of the present disclosure. Although the engine 20 is illustrated as a turbofan engine, the engine may be of any other type. It is to be understood that the engine 20 is shown primarily for illustrative purposes to assist in disclosing features of various embodiments, and that FIG. 1 does not depict all of the components of an engine.

The engine 20 includes a core flow nozzle 22 and variable area fan nozzle (VAFN) 24. The core flow nozzle 22 forms a downstream end of a core engine nacelle that surrounds the core engine (not shown). The VAFN 24 is mounted to a downstream end 26 or lip area of a thrust reverser sleeve 28. The sleeve 28 overlaps at least a portion of the core engine nacelle. The engine 20 provides thrust from both a core flow of engine exhaust exiting the core flow nozzle 22 and a fan flow exiting from the VAFN 24. The core flow typically has a higher velocity than the fan flow.

The VAFN 24 includes a plurality of petals 30 configured to alter the fan flow passing through a fan duct 32 of the engine 20. The petals 30 may be elastically deformable petals or pivotable rigid petals. In one example, each of the plurality of petals 30 is generally trapezoidal in shape, although the petals 30 may have any other shape. Each of the petals 30 include a first side 34 and an opposite second side 36 that extend in a generally longitudinal direction from a supported end 38 to a free end 40. The petals 30 may be disposed side by side along a circumference of the fan duct 32, with the supported ends 38 of the petals 30 mounted to the downstream end 26 of the thrust reverser sleeve 28. The free ends 40 of the petals 30 form a nozzle opening 42 or circumference, which is associated with a nozzle area of the VAFN 24.

The petals 30 are configured to alter the nozzle area in order to change the fan flow passing through the fan duct 32. For instance, the petals 30 may be moved inward or outward using actuators 44, 46 connected to a flex rod 48. The flex rod 48 may press on the petals 30 disposed between actuators 44, 46. The actuators 44, 46 may be hydraulically actuated via electrohydraulic servo valves configured to control supply of hydraulic fluid to the actuators 44, 46. However, other configurations for actuation of the plurality of petals 30 may be used.

In the example shown in FIG. 1, the VAFN 24 includes two sets of petals 30 arranged on opposite sides of an engine pylon 50, although only one set of petals 30 is visible in this view. Disposed generally circumferentially, the flex rod 48 comprises a cable that extends between the actuators 44, 46. The flex rod 48 contacts all the petals in the respective set, and ends of the flex rod 48 are attached to the actuators 44, 46, such as via arms mounted to shafts.

In addition, adjacent petals 30 in each set may be separated by a gap occupied by an elastomeric seal 52. Composed of silicone rubber or any other suitable material, seals 52 are used to prevent leakage of air from inside to outside the VAFN 24. Seals 52 return from a stretched condition to a nominal condition during inward actuation of the petals 30. Other configurations for the VAFN 24 can be used. Furthermore, aspects of this disclosure may apply to other types of VAFN 24.

Figure 2:
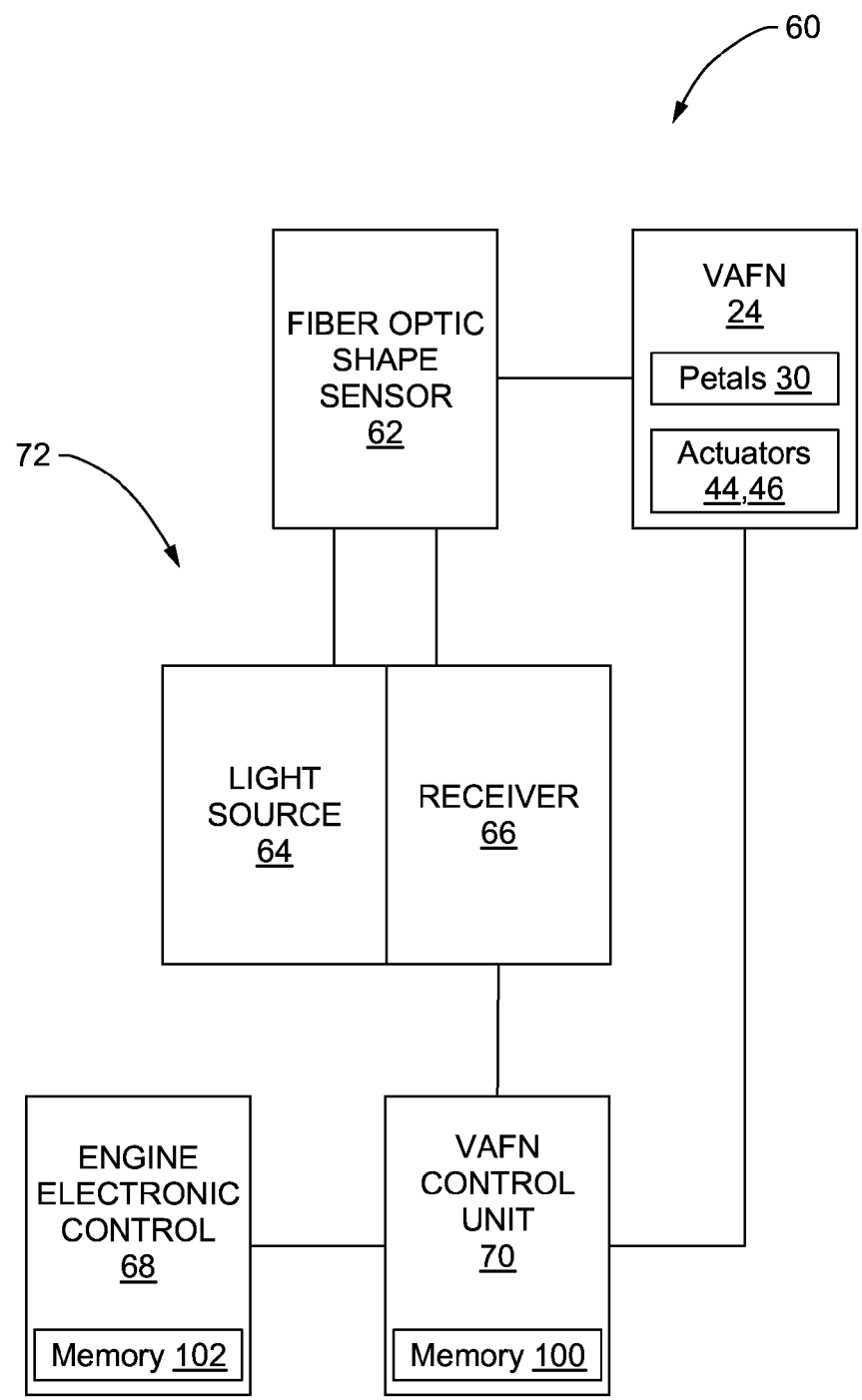
FIG. 2 is a schematic representation of a control system for a variable area fan nozzle (VAFN) of the turbofan engine of FIG. 1, in accordance with another embodiment.

Referring now to FIG. 2, with continued reference to FIG. 1, the engine 20 further includes a control system 60 for the VAFN 24. The control system 60 comprises at least one fiber optic shape sensor 62, a light source 64, a receiver 66, an engine electronic control 68, and a VAFN control unit 70. Extending along at least one of the petals 30 of the VAFN 24, the at least one fiber optic shape sensor 62 is operatively connected to the light source 64 and the receiver 66.

The light source 64 is configured to direct a light through the fiber optic shape sensor 62. For example, the light source 64 may comprise a wavelength tunable laser. However, other types of lasers and light sources may be used. The receiver 66 is configured to receive a reflected light from the fiber optic shape sensor 62 and measure a strain along the fiber optic shape sensor 62 based on the reflected light in real-time. In one example, the light source 64 and the receiver 66 may be packaged together as a fiber optic transmitter and receiver 72, although other configurations may be used.

Configured to transmit the light from the light source 64, the fiber optic shape sensor 62 comprises an optical fiber that includes fiber optic sensing devices. For example, a single optical fiber may include thousands of fiber optic sensing devices along a length of the fiber, although more or less fiber optic sensing devices may be used. The fiber optic sensing devices are used to obtain strain measurement data at several points along the length of the optical fiber.

Fiber optic sensing devices may comprise a plurality of Fiber Bragg gratings, Optical Frequency Domain Reflectometry (OFDR) technology, and the like. For instance, Fiber Bragg gratings are configured to reflect predetermined wavelengths of light. With OFDR technology, gratings are disposed side by side along the optical fiber to provide a fully distributed sensing fiber. Changes in the reflected light's wavelengths directly correspond to an applied strain on the fiber optic shape sensor 62.

The reflected light from the fiber optic sensing devices is detected by the receiver 66. For example, the receiver 66 may comprise data acquisition hardware and a processor-based device with an associated memory, although other types of receivers may be used. Software, such as a strain to displacement algorithm, may be programmed into the memory of the receiver 66. From the light reflected by the fiber optic sensing devices in the optical fiber of the fiber optic shape sensor 62, the receiver 66 may detect wavelength shifts, time delays, and other strain measurement data as light passes along the length of the fiber optic shape sensor 62.

By measuring a real-time strain in the fiber optic shape sensor 62, the receiver 66 can determine a displacement of the fiber optic shape sensor 62, and thereby a displacement of the petal 30. More specifically, the receiver 66 determines the displacement or position of the petal 30 by integrating the strain measurements from the fiber optic shape sensor 62. Furthermore, the receiver 66 sends signals indicative of the displacement of the petal 30 to the VAFN control unit 70 in order to accurately calculate the nozzle area of the VAFN 24 in real-time.

Figure 3:
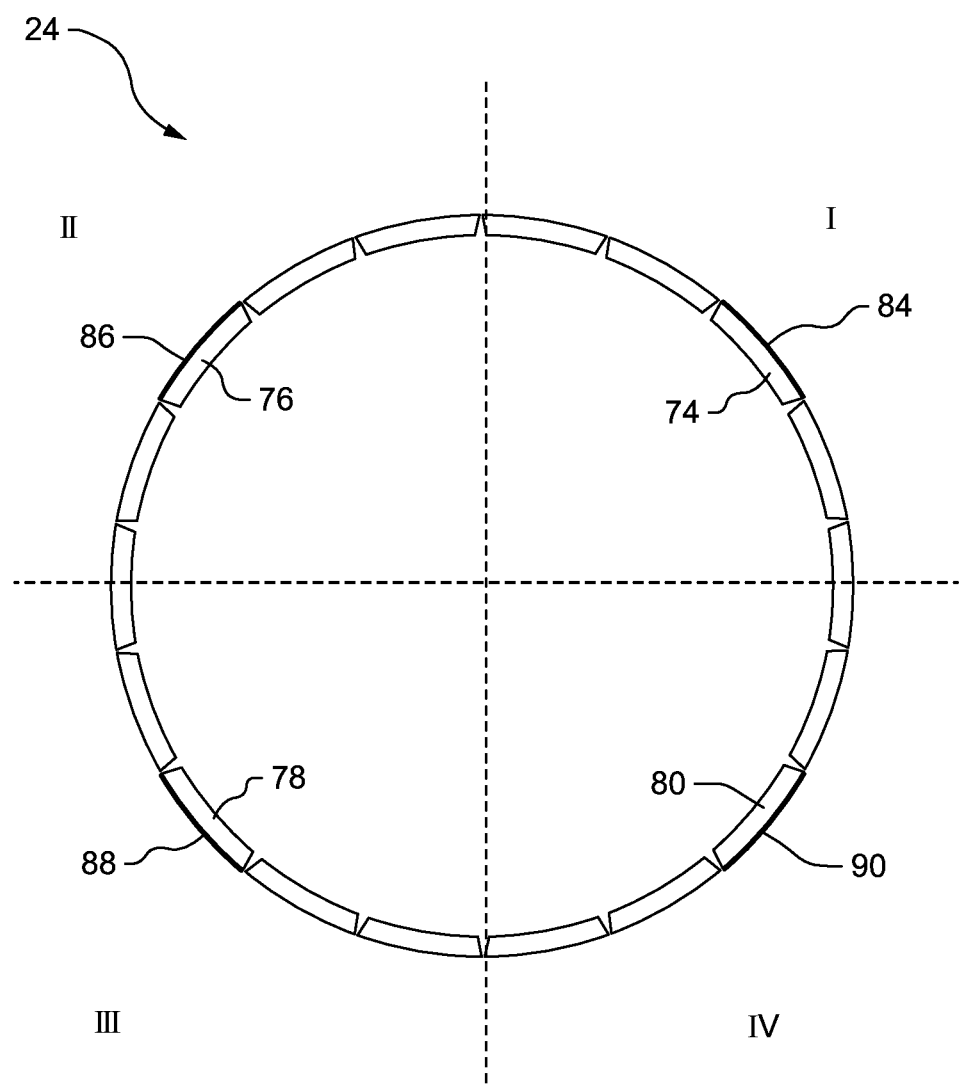
FIG. 3 is a view of a VAFN from aft looking forward, in accordance with another embodiment.

The one or more fiber optic shape sensors 62 may be disposed in various arrangements on the petals 30 of the VAFN 24. For example, as shown in FIG. 3, if the VAFN 24 is divided into four quadrants I, II, III, IV, one petal 74, 76, 78, 80 in each of the four quadrants I, II, III, IV, may include a fiber optic shape sensor 84, 86, 88, 90 respectively. However, other configurations can be used. In addition, more or less than four petals may include fiber optic shape sensors, and more or less than four fiber optic shape sensors may be used. In another example, all of the petals in the VAFN include at least one fiber optic shape sensor 62.

Figure 4:
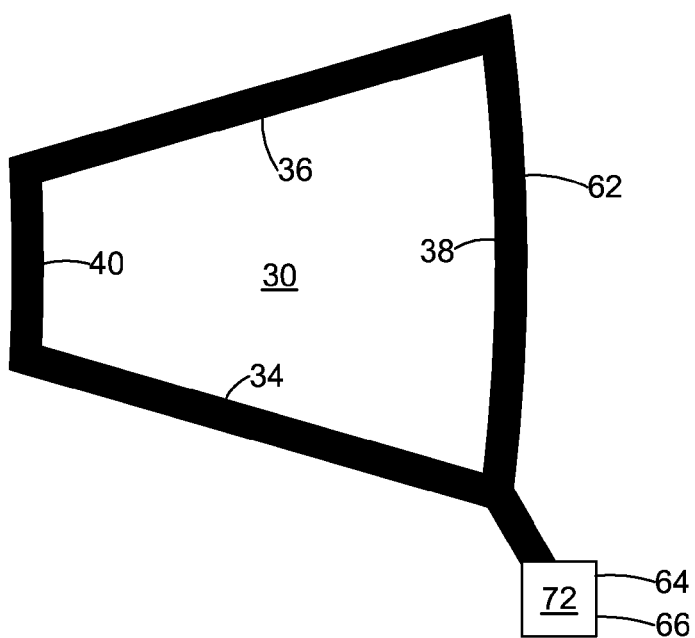
FIG. 4 is a schematic representation of a fiber optic shape sensor on a petal of a VAFN, in accordance with another embodiment.
Figure 5:
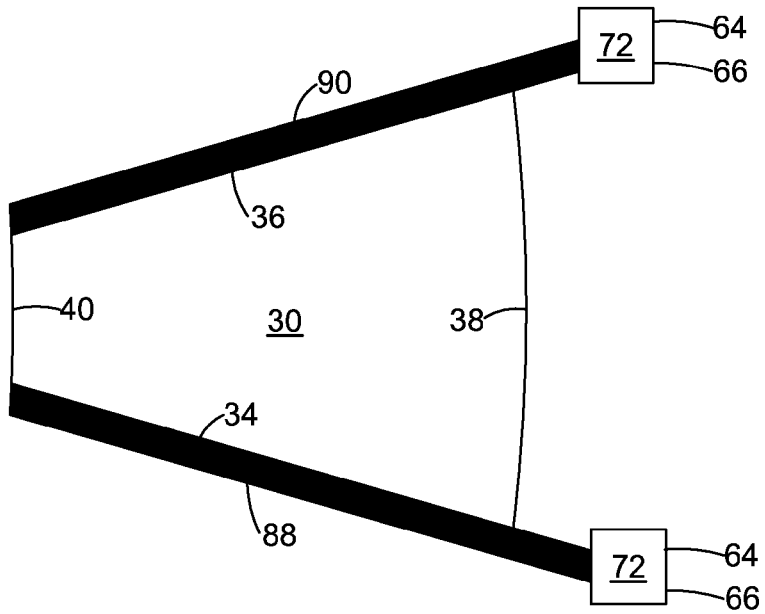
FIG. 5 is a schematic representation of two fiber optic shape sensors on a petal of a
VAFN, in accordance with another embodiment.

As shown in FIG. 4, the fiber optic shape sensor 62 extends along a perimeter of the petal 30. In this example, the fiber optic shape sensor 62 extends in a continuous loop around the first side 34, the free end 40, the second side 36, and the supported end 38. In another example, the at least one fiber optic shape sensor 62 comprises two fiber optic shape sensors 88, 90, shown in FIG. 5. The first fiber optic shape sensor 88 extends along the first side 34, and the second fiber optic shape sensor 90 extends along the opposite second side 36. In so doing, the fiber optic shape sensors 62, 88, 90 can be used to detect displacement, such as a deflection and/or twist of the petal 30.

Figure 6:
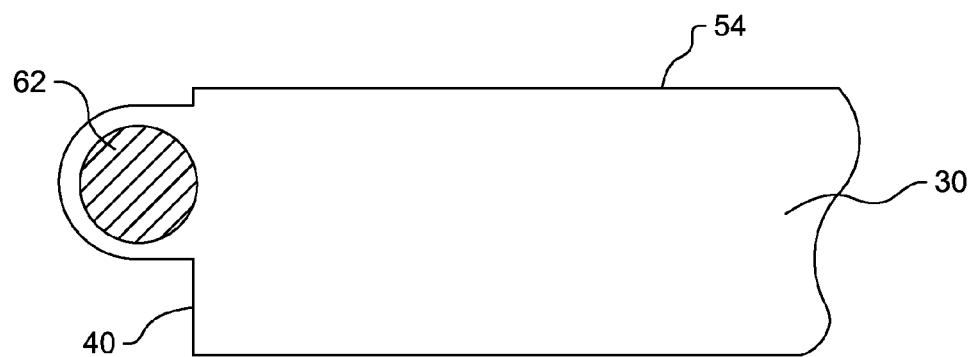
FIG. 6 is a cross-sectional view of an fiber optic shape sensor embedded within a petal of a VAFN, in accordance with another embodiment.
Figure 7:
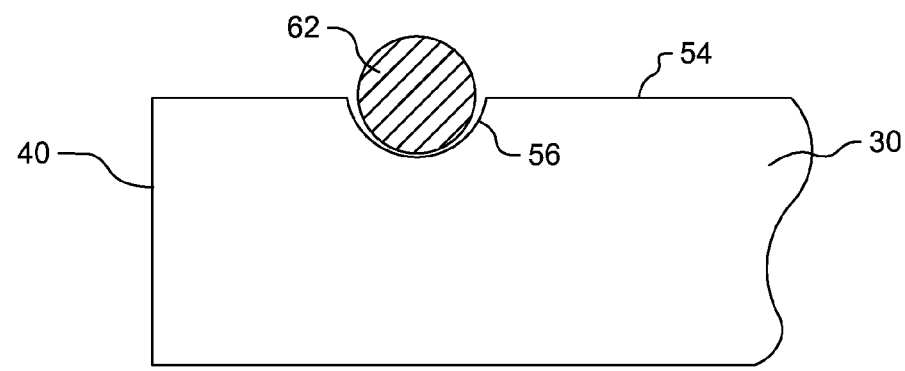
FIG. 7 is a cross-sectional view of an fiber optic shape sensor attached to an external surface of a petal of a VAFN, in accordance with another embodiment.

In addition, the at least one fiber optic shape sensor 62 may be embedded inside the petal 30 or installed on a surface of the petal 30. For example, the fiber optic shape sensor 62 can be embedded within the sides 34, 36 and/or the ends 38, 40. FIG. 6 illustrates an example wherein the fiber optic shape sensor 62 is embedded on the free end 40 of the petal 30. As shown in FIG. 7, the fiber optic shape sensor 62 may be attached to an external surface 54 of the petal 30, such as to a channel 56 on the external surface 54 of the petal. However, the fiber optic shape sensor 62 can be attached or embedded to the petal 30 in other ways.

Figure 8:
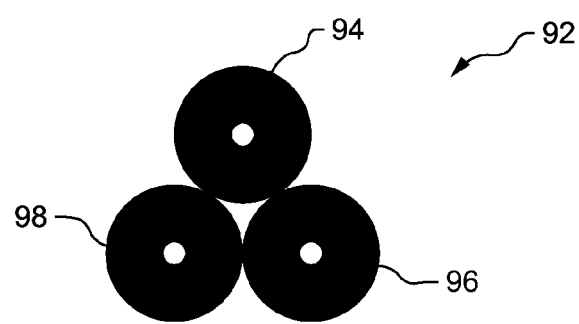
FIG. 8 is a cross-sectional view of a three-dimensional fiber optic shape sensor, in accordance with another embodiment.

Furthermore, the control system 60 can be used to provide three-dimensional (3D) shape sensing of the VAFN 24 in real-time. The at least one fiber optic shape sensor 62 may comprise a 3D fiber optic shape sensor 92, shown in FIG. 8. The 3D fiber optic shape sensor 92 comprises three individual optical fibers 94, 96, 98, each including fiber optic sensing devices, bundled together. The receiver 66 collects and combines strain measurement data from each of the optical fibers 94, 96, 98 in order to determine a displacement of the petals 30 in 3D space. In so doing, a shape of the nozzle opening 42 can be determined in 3D space, and therefore, an accurate nozzle area of the VAFN 24 can be calculated in real-time.

Referring back to FIG. 2, the VAFN control unit 70 is in operative communication with the plurality of petals 30, the receiver 66, and the engine electronic control 68. The VAFN control unit 70 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the VAFN 24 and the plurality of petals 30.

For example, the VAFN control unit 70 may be configured to operate according to predetermined algorithms or sets of instructions for operating the control system 60. Such algorithms or sets of instructions may be programmed or incorporated into a memory 100 associated with or at least accessible to the VAFN control unit 70. The memory 100 may comprise a non-volatile memory provided within and/or external to the VAFN control unit 70. It is understood that the VAFN control unit 70 and the control system 60 may include other hardware, software, firmware, and combinations thereof.

Similarly, the engine electronic control 68 comprises a processor-based device with an associated memory 102 for electronically controlling functionality of the overall engine 20. The engine electronic control 68 is configured to generate a desired nozzle area and send a corresponding signal to the VAFN control unit 70. In one example, the engine electronic control 68 may generate the desired nozzle area based on an engine operating condition.

For instance, the engine electronic control 68 may include a predetermined table of optimum or desired nozzle areas for different engine operating conditions in order to achieve a desired result. The predetermined table of desired nozzle areas may be preprogrammed into the memory 102 associated with the engine electronic control 68. Examples of engine operating conditions may include take-off, climb, cruise, flight conditions, thrust conditions, and the like.

Examples of desired results may include a lower fuel burn, a fuel flow, a thrust, and the like. Based on the real-time engine operating condition, the engine electronic control 68 retrieves from memory 102 the desired nozzle area from the predetermined table.

The engine electronic control 68 then sends a command to the VAFN control unit 70 to achieve an appropriate opening area of the VAFN 24 for the current engine operating condition. The engine electronic control 68 can also determine that no optimum area can be achieved for a particular engine operating condition and may determine a non-optimum area for that particular condition. The VAFN control unit 70 controls the rate of movement of the petals 30 to different positions or maintains a position to achieve the desired nozzle area.

Based on the signal indicative of the desired nozzle area from the engine electronic control 68, the VAFN control unit 70 may send corresponding signals to the electrohydraulic servo valve in order to control hydraulic flow to the actuators 44, 46. For instance, the VAFN control unit 70 may send signals to the electrohydraulic servo valve to increase or decrease hydraulic flow to the actuators 44, 46 of the flex rod 48 and move the petals 30 outward or inward in order to change the shape of the nozzle opening 42 (FIG. 1) and achieve the desired nozzle area. The VAFN control unit 70 may also send signals to the electrohydraulic servo valve to maintain a same hydraulic flow to the actuators 44, 46 in order to maintain a same nozzle area.

Figure 9:
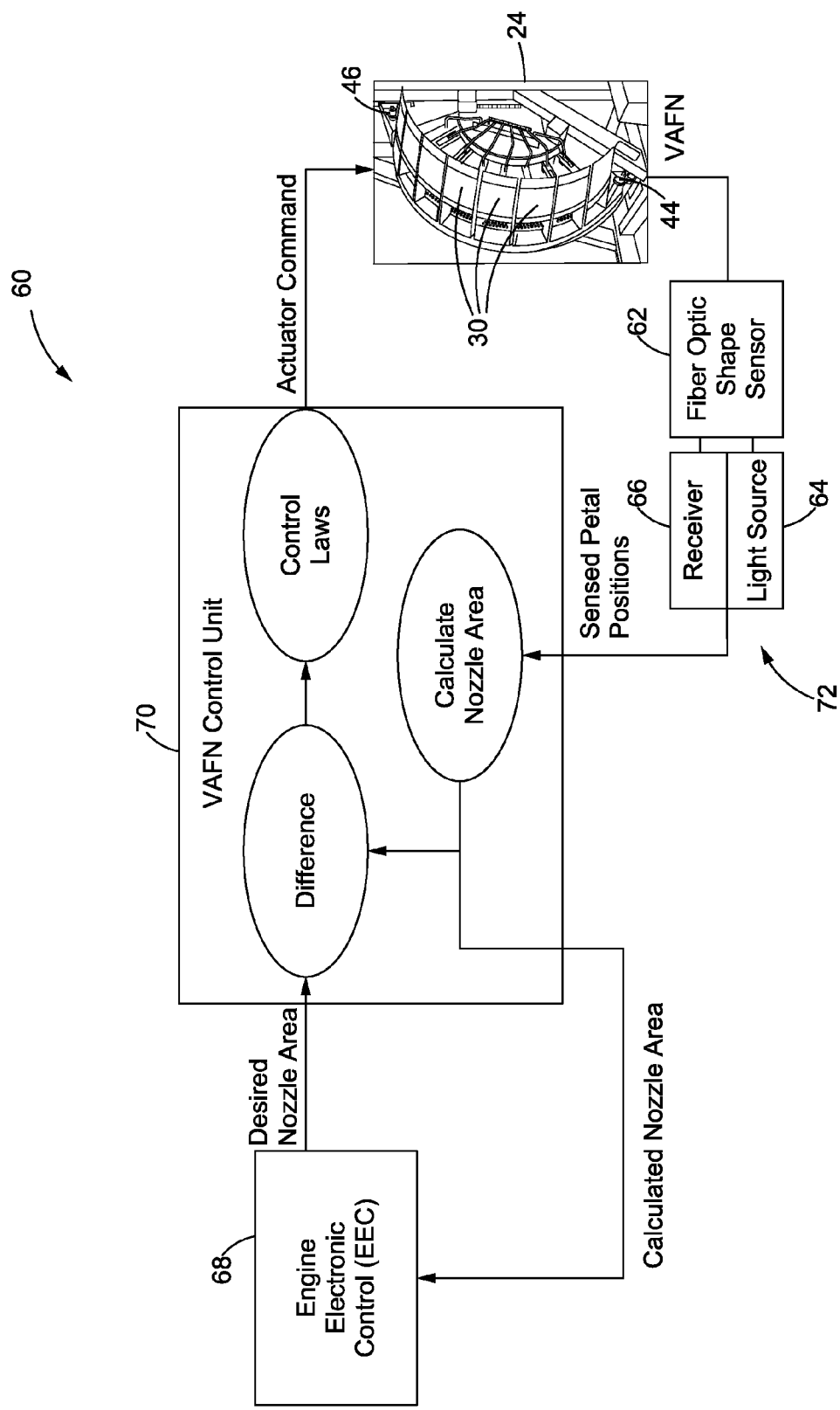
FIG. 9 is a schematic representation of the control system of FIG. 2, in accordance with another embodiment.

Turning now to FIG. 9, with continued reference to FIGS. 1-8, a schematic representation of the control system 60 is shown, in accordance with another embodiment. The VAFN control unit 70 is configured to receive the signals from the receiver 66 indicative of the sensed position of the petals 30, such as the measured strain along the fiber optic shape sensor 62 and determined displacement of the petals 30. Based on the signals from the receiver 66, the VAFN control unit 70 is configured to calculate a real-time nozzle area of the VAFN 24. For example, along with the real-time data from the receiver 66, the VAFN control unit 70 may use predetermined formulae and information, such as an installation geometry of the VAFN 24, preprogrammed into memory 100 in order to calculate the real-time nozzle area of the VAFN 24.

The VAFN control unit 70 is further configured to send a signal indicative of the calculated real-time nozzle area of the VAFN 24 to the engine electronic control 68. The engine electronic control 68 may use this feedback to record a fault, if necessary, and adjust engine operating conditions. The VAFN control unit 70 is also configured to receive the signal from the engine electronic control 68 indicative of the desired nozzle area. Based on the signals from the receiver 66 and the engine electronic control 68, the VAFN control unit 70 is configured to generate an actuator command to adjust the petals 30.

After calculating the real-time nozzle area of the VAFN 24 based on the sensed petal position from the receiver 66, the VAFN control unit 70 is configured to determine a difference between the calculated nozzle area and the desired nozzle area from the engine electronic control 68. Based on the determined difference between the calculated nozzle area and the desired nozzle area, the VAFN control unit 70 is further configured to use control laws to generate the actuator command. The actuator command may be sent to the electrohydraulic servo valves that control hydraulic flow to the actuators 44, 46 of the flex rod 48 in contact with the petals 30.

For example, the VAFN control unit 70 may be configured to use proportional integral differential (PID), linear quadratic regression (LQR), or bang-bang control. However, other types of feedback loop control and control laws may be used in the VAFN control unit 70. More specifically, using control laws such as PID, LQR, or bang-bang control, the VAFN control unit 70 continuously applies the difference between the calculated nozzle area in real-time and the desired nozzle area as feedback in order to generate actuator commands and modify the real-time nozzle area such that it may nearly accomplish, if not achieve, the desired nozzle area. In so doing, the VAFN control unit 70 can precisely control a rate of movement of the petals 30 and avoid misplacement of a predetermined position for the petals 30. Moreover, the control system 60 allows for infinite petal position settings, and thereby infinite nozzle opening area settings, due to the accurate position sensing and controlling of the petals 30 of the VAFN 24.

INDUSTRIAL APPLICABILITY

From the foregoing, it can be seen that the teachings of this disclosure can find industrial application, technical effects and benefits in any number of different situations, including but not limited to, engines, such as turbofan engines. Such engines may be used, for example, on aircraft for generating thrust, or in land, marine, or aircraft applications for generating power.

The present disclosure provides a control system for a variable area fan nozzle (VAFN) of a turbofan engine. The disclosed control system uses a fiber optic system and a VAFN control unit to measure and monitor a real-time position of the VAFN petals. In addition, the disclosed fiber optic system may use a three-dimensional (3D) fiber optic shape sensor to determine a shape of the VAFN petals in 3D space. By using the disclosed control system, an accurate real-time nozzle area of the VAFN may be computed and a desired nozzle area of the VAFN may be nearly accomplished, if not achieved. As a result, the disclosed control system may allow for infinite petal positions and VAFN nozzle area settings.

Figure 10:
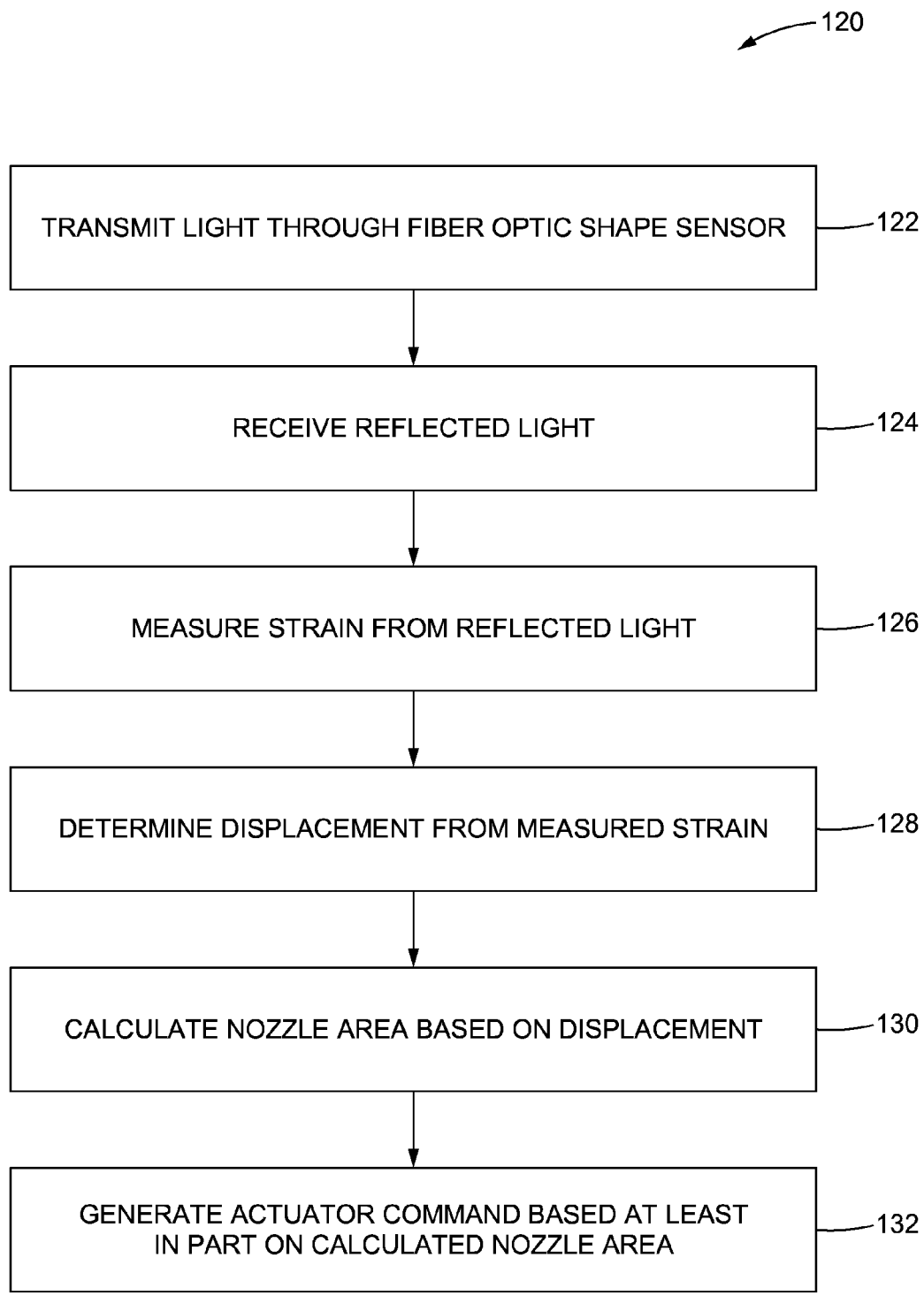
FIG. 10 is a flowchart illustrating an example process controlling a nozzle area of a VAFN, in accordance with another embodiment.

Referring now to FIG. 10, with continued reference to FIGS. 1-9, a flowchart illustrating an example algorithm or process 120 of controlling a nozzle area of a VAFN 24 is shown, in accordance with another embodiment. The VAFN 24 has a plurality of petals 30 and at least one fiber optic shape sensor 62 on at least one of the plurality of petals 30. At block 122, a light is transmitted through the at least one fiber optic shape sensor 62, such as from the light source 64.

Reflected light from the at least one fiber optic shape sensor 62 is received, at block 124, such as via the receiver 66. At block 126, a strain is measured based on the received reflected light from the at least one fiber optic shape sensor 62, and at block 128, a displacement of the at least one fiber optic shape sensor 62 is determined based on the measured strain. The receiver 66 may measure the strain, determine the displacement, and send corresponding signals to the VAFN control unit 70.

At block 130, the nozzle area of the opening 42 defined by the plurality of petals 30 is calculated based on the determined displacement of the at least one fiber optic shape sensor 62. At block 132, an actuator command is generated based at least in part on the calculated nozzle area. The VAFN control unit 70 may calculate the nozzle area, generate the actuator command, and send the actuator command to the actuators 44, 46 configured to move the flex rod 48 in contact with the petals 30. In so doing, the VAFN control unit 70 may monitor and control the nozzle opening 42 of the VAFN 24 in order to nearly accomplish, if not achieve, the desired nozzle area.

Figure 11:
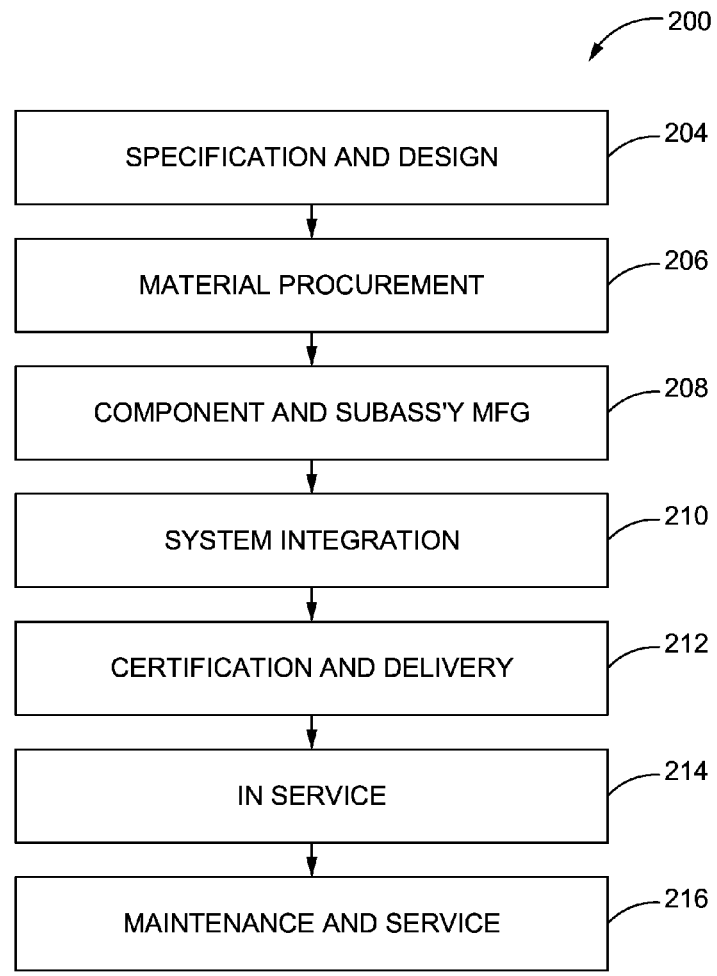
FIG. 11 is a flowchart of aircraft production and service methodology.
Figure 12:
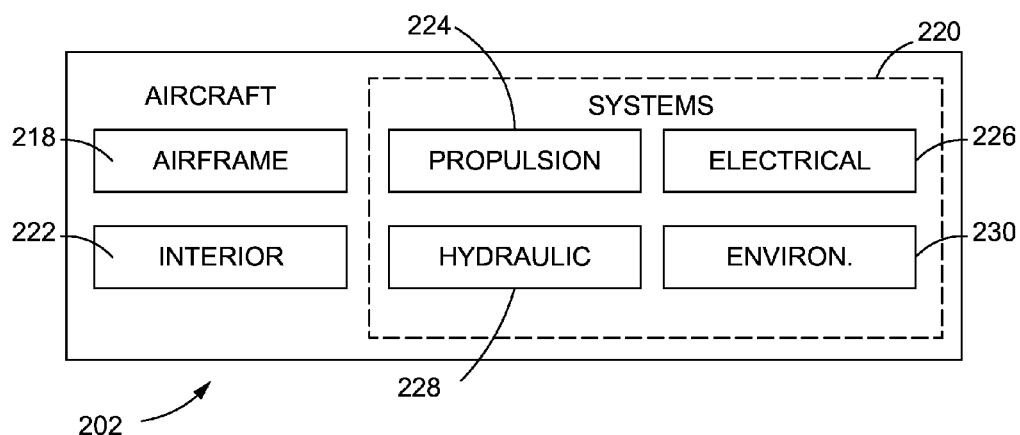
FIG. 12 is a block diagram of an aircraft.

Furthermore, embodiments of the disclosure may be described in the context of an aircraft manufacturing and service method 200 as shown in FIG. 11 and an aircraft 202 as shown in FIG. 12. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on). A control system for a variable area fan nozzle may be added at any one of these stages. For example, the control system may be added during manufacturing 208 or system integration 210. In some cases, the control system may be added while the aircraft 202 is in service.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry. Accordingly, in addition to aircraft 202, the features disclosed herein may apply to other vehicles, such as land vehicles, marine vehicles, space vehicles, and the like. A control system for a variable area fan nozzle may be a part of a propulsion system 224 and/or an electrical system 226.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during operations 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

It is to be understood that the flowcharts in FIGS. 10 and 11 are shown and described as an example only to assist in disclosing the features of the disclosed control system, and that more or less steps than that shown may be included in the processes corresponding to the various features described above for the disclosed control system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for a variable area fan nozzle (VAFN) having a plurality of petals, the control system comprising:
a fiber optic shape sensor forming a continuous loop around the perimeter of each petal of the plurality of petals;
a respective light source operatively connected to, and configured to direct a light through, each of the fiber optic shape sensors;
a respective receiver operatively connected to each of the fiber optic shape sensors, each respective receiver configured to receive a reflected light from an associated fiber optic shape sensor and measure a strain along the associated fiber optic shape sensor based on the reflected light; and
a VAFN control unit in operative communication with the plurality of petals and the respective receivers, the VAFN control unit configured to receive a first signal from each respective receiver indicative of the measured strain along each of the associated fiber optic shape sensors, and calculate an actual nozzle area of the VAFN based on the measured strain.

2. The control system of claim 1, wherein each respective receiver is further configured to determine a displacement of the associated fiber optic shape sensor based on the measured strain.

3. The control system of claim 1, wherein each fiber optic shape sensor includes an optical fiber having a plurality of Fiber Bragg gratings configured to reflect predetermined wavelengths of light.

4. The control system of claim 1, wherein each fiber optic shape sensor includes Optical Frequency Domain Reflectometry (OFDR) technology configured to provide a fully distributed sensing fiber.

5. The control system of claim 4, wherein each respective light source comprises a wavelength tunable laser.

6. The control system of claim 1, wherein each fiber optic shape sensor comprises three optical fibers with fiber optic sensing devices bundled together, and wherein each respective receiver is further configured to determine a three-dimensional displacement of the associated fiber optic shape sensor based on the measured strain from the three optical fibers bundled together.

7. The control system of claim 6, wherein the VAFN control unit is further configured to determine a three-dimensional position of each petal of the plurality of petals based on the determined three-dimensional displacement from each respective receiver.

8. The control system of claim 1, further comprising an engine electronic control in communication with the VAFN control unit, the engine electronic control configured to generate a command nozzle area for the VAFN and send a second signal to the VAFN control unit indicative of the command nozzle area.

9. The control system of claim 8, wherein the VAFN control unit is further configured to determine a difference between the actual nozzle area and the command nozzle area.

10. The control system of claim 9, wherein the VAFN control unit is further configured to generate an actuator command for the plurality of petals based on the determined difference between the actual nozzle area and the command nozzle area.

11. The control system of claim 10, wherein the VAFN control unit uses one of proportional integral differential, linear quadratic regression, or bang-bang control to generate the actuator command.

12. The control system of claim 11, wherein the engine electronic control is configured to generate the command nozzle area based on an engine operating condition.

13. A variable area fan nozzle (VAFN) comprising:
a plurality of petals disposed along a circumference of a fan duct, wherein each petal of the plurality of petals includes a first side and an opposite second side that extend in a longitudinal direction from a supported end to a free end that forms an opening of the VAFN;
each respective petal of the plurality of petals having an associated pair of first and second fiber optic shape sensors, wherein the first fiber optic shape sensor extends along at least the first side of the respective petal of the plurality of petals and the second fiber optic shape sensor extends along the opposite second side of the respective petal of the plurality of petals;
respective first and second light sources configured to direct light through the first and second fiber optic shape sensors of each associated pair of first and second fiber optic shape sensors;
respective first and second receivers configured to receive reflected light from the first and second fiber optic shape sensors of each associated pair of first and second fiber optic shape sensors and determine displacement of the first and second fiber optic shape sensors of each associated pair of first and second fiber optic shape sensors based on the reflected light;
an engine electronic control configured to generate a command nozzle area of the opening of the VAFN based on an engine operating condition; and
a VAFN control unit in operative communication with the plurality of petals, each respective first and second receiver, and the engine electronic control, the VAFN control unit configured to receive a sensor displacement signal indicative of the determined displacement from each respective first and second receiver, calculate an actual nozzle area of the VAFN based on the determined displacement from each respective first and second receiver, receive a command nozzle area signal indicative of the command nozzle area from the engine electronic control, determine a difference between the actual nozzle area and the command nozzle area, and generate an actuator command based on the determined difference between the actual nozzle area and the command nozzle area.

14. The VAFN of claim 13, wherein the first and second fiber optic shape sensors of each associated pair of first and second fiber optic shape sensors are embedded inside the respective petal of the plurality of petals.

15. The VAFN of claim 13, wherein the first and second fiber optic shape sensors of each associated pair of first and second fiber optic shape sensors are attached to a surface of the respective petal of the plurality of petals.

16. A method of controlling a nozzle area of a variable area fan nozzle (VAFN) having a plurality of petals, each petal of the plurality of petals having an associated fiber optic shape sensor, the method comprising:
transmitting light through each associated fiber optic shape sensor, wherein each associated fiber optic shape sensor forms a continuous loop around the perimeter of a respective petal of the plurality of petals;
receiving reflected light from each associated fiber optic shape sensor;
measuring strain based on the received reflected light from each associated fiber optic shape sensor;
determining a displacement of each associated fiber optic shape sensor based on the measured strain, the receiving, measuring, and determining being performed by a respective receiver operably coupled to each associated fiber optic shape sensor;
calculating an actual nozzle area of an opening defined by the plurality of petals based on the determined displacement of each associated fiber optic shape sensor; and
generating an actuator command based at least in part on the actual nozzle area, the calculating and generating being performed by a VAFN control unit.

17. The method of claim 16, wherein each associated fiber optic shape sensor includes three bundled optical fibers with fiber optic sensing devices to form each associated fiber optic shape sensor, the method further comprising determining a three-dimensional shape of each petal of the plurality of petals.

18. The method of claim 16, further comprising sending the actuator command to an actuator configured to move a flex rod in contract with the plurality of petals.

* * * * *